United States Patent [19]

Clauset, Jr.

[11] 4,205,723
[45] Jun. 3, 1980

[54] ATTIC OIL RESERVOIR RECOVERY METHOD

[75] Inventor: Alvin O. Clauset, Jr., Houston, Tex.

[73] Assignee: Texaco Inc., White Plains, N.Y.

[21] Appl. No.: 952,754

[22] Filed: Oct. 19, 1978

[51] Int. Cl.² .................. E21B 33/138; E21B 43/18
[52] U.S. Cl. .................................. 166/294; 166/305 R
[58] Field of Search .............. 166/263, 274, 275, 285, 166/294, 295, 305 R

[56] References Cited

U.S. PATENT DOCUMENTS

| | | | |
|---|---|---|---|
| 1,067,868 | 7/1913 | Dunn | 166/305 R |
| 3,032,499 | 5/1962 | Brown | 166/305 R |
| 3,308,885 | 3/1967 | Sandiford | 166/305 R X |
| 3,400,761 | 9/1968 | Latimer, Jr. et al. | 166/305 R X |
| 3,411,577 | 11/1968 | Altamira | 166/305 R X |
| 4,042,029 | 8/1977 | Offeringa | 166/305 R X |
| 4,095,651 | 1/1978 | Chauveteau | 166/294 |
| 4,120,361 | 10/1978 | Threlkeld et al. | 166/294 |

OTHER PUBLICATIONS

Bleakley, "Chevron's Attic-Oil Recovery South Louisiana Looks Good," *Oil and Gas Journal,* Nov. 13, 1967, pp. 132–134.

*Primary Examiner*—Stephen J. Novosad
*Assistant Examiner*—George A. Suchfield
*Attorney, Agent, or Firm*—Carl G. Ries; Robert A. Kulason; Gregory A. Cone

[57] ABSTRACT

In a conventional attic oil reservoir recovery program wherein gas is injected through a well into an attic reservoir, the gas then migrating updip and displacing oil downward to the producing interval in the well wherefrom the oil is then produced, the improvement is added wherein at the completion of the gas injection step a water excluding agent is injected into the reservoir in the immediate vicinity of the well bore which prevents the formation water from restricting the flow of oil into the well bore and being produced.

5 Claims, No Drawings

ATTIC OIL RESERVOIR RECOVERY METHOD

BACKGROUND OF THE INVENTION

1. Field of the Invention

This invention relates to the recovery of petroleum from subterranean reservoirs and more specifically to the recovery of petroleum from attic reservoirs by an improved gas injection process.

2. Description of the Prior Art

Many, if not most, petroleum reservoirs can be characterized as inclined and/or curved roughly laminar solids composed of porous rock into which petroleum has migrated. The petroleum accumulates in the reservoir because of the presence of an effective permeability barrier to the further upward migration of the petroleum at the stratigraphic top of the reservoir. This permeability barrier may be caused by several physical conditions. The presence of an impermeable caprock, faulting, and stratigraphic pinch outs being the most common. Often, but not always, petroleum gas will be present in the uppermost portion of the reservoir. Below this gas, and separated by the gas-oil contact would be found the oil. Beneath the oil would be the connate water of the reservoir rocks, the interface between the two being marked by the oil-water contact.

As the petroleum reservoir is developed as an oil field, the oil and gas are drawn off and the oil-water contact in the reservoir rises. This process continues until the oil-water contact reaches the structurally highest producing well in the oil field. Normally, this will mark the economic limit to the further development of the oil field and its subsequent abandonment. Nevertheless, in many reservoirs there remains a substantial volume of oil in that portion of the reservoir above the uppermost well and below the permeability barrier which forms a seal at the top of the reservoir. This untapped portion is called the attic oil reservoir.

The normal technique to produce this attic oil is to inject gas into the reservoir. Injection of the gas causes a downward displacement of the oil-water contact corresponding to the volume of gas injected. The injected bubble of gas rises to the top of the attic reservoir and displaces a corresponding volume of oil downward toward the producing interval in the uppermost well. This in turn allows resumed production of oil from this well. If this well begins to produce too much water again, signifying that the oil-water contact has again risen to the level of producing interval in that well, the gas injection process can be repeated.

This gas injection method is not without problems, however. As the uppermost well is produced, the water level beneath the well, marked by the oil-water contact, commonly will not remain as a relatively flat surface, but will instead form a cone with the apex at the producing interval in that well. This effect is commonly referred to as "water coning". It is caused by the difference in relative mobility between the connate water and the oil. When the uppermost well is put back on production, a low pressure area is created in the reservoir at the point of the producing interval in that well. The initial fluid to be produced will be oil, of course, since the oil should now surround the producing interval in the well. However, as this oil is produced, the oil-water contact beneath the well begins to be distorted upward due to the higher relative mobility of the formation water until the formation water again breaks through into the producing well.

It is readily seen that substantially more oil could be produced if this phenomenon of water coning could be corrected. In point of fact, there is no process at present that effectively attacks the problem, and the commercial need thereof is substantial. This invention provides a solution to water coning and recovery of oil from attic oil reservoirs.

SUMMARY OF THE INVENTION

This invention relates to a method of recovering oil from an attic oil reservoir comprising:

(a) injecting a volume of gas into the uppermost producing well, (b) waiting a short period of time until the gas concentration at the well bore is less than about 10%, (c) pumping a water excluding agent into the well bore, (d) waiting for the injected gas volume to migrate to the top of the attic oil reservoir, (e) placing the well on production.

DESCRIPTION OF THE PREFERRED EMBODIMENT

In order for an attic oil recovery program to be successful, several conditions must be satisfied. First, the formation water in the vicinity of the well must be flushed away by the injected gas sufficiently to reduce the relative water permeability to the lowest possible value in that region. This will facilitate the flow of the displaced oil back into this region. Second, the oil-water contact must be lowered sufficiently to prevent the early formation of a water cone. Third, the volume of the injected gas must be adequate to displace the oil layer downward to the level of the producing interval, yet not so large as to displace the oil layer below the producing interval, resulting in gas production rather than oil production when the well is put back on production. Fourth, the injected gas must have sufficient time to migrate upward to displace the oil down to the producing well.

The first condition can be satisfied in part by injecting the gas at a high injection rate. This will serve to flush the formation water out of the zone around the producing well and in turn lower this region's relative permeability to water to a minimum. To this end, the gas should be injected at rates above 0.5 MSCF per day and preferably at a rate between 1 and 5 MSCF per day.

The second and third conditions can be satisfied by determining the amount of gas needed to be injected per foot of depression of the oil-water contact for a particular reservoir. This can be calculated by using the following formula:

$$\Delta Q_I = 0.178 \Phi E_{DOW} h L / B_g \sin\theta$$

Where:
$\Delta Q_I$ = gas volume injected per foot of depression of the oil-water contact (MSCF)
$\Phi$ = porosity
$E_{DOW}$ = displacement efficiency of oil driving water downward (typical value=0.8)
h = true reservoir thickness at well (ft.)
L = width of reservoir at oil-water contact (ft.)
$B_g$ = gas conversion factor RB/MSCF where RB=reservoir barrels and MSCF=thousands of standard cubic feet $\theta$ = dip angle of reservoir measured from oil-water contact Use of this formula is demonstrated in the following example:

EXAMPLE I

For a reservoir with the following parameters:
$B_g = 0.7$ RB/MSCF; $h = 34.2$ ft.; $L = 1000$ ft.
$\Phi = 0.25$; $\theta = 20''$ and $E_{DOW} = 0.8$ $$\Delta Q_I = \frac{.178 \times .25 \times .8 \times 34.2 \times 1000}{0.7 \times .342}$$

= 5100 *MSCF* of gas per foot of oil-water contact depression

If the operator desires to lower the oil-water contact 20 feet, $\Delta Q_I$ total $= 20 \times 5100 = 102,000$ MSCF.

The fourth condition requires that the operator wait a sufficient length of time for the injected gas bubble to migrate upward before resuming production in order that the opening of the well to production not pull the injected gas bubble back into the well before it has had time to migrate to the top of the reservoir. This time interval will depend on the particular parameters of the individual oil reservoir and is best determined by the operator in the field. Generally, one can assume that sufficient time has elapsed when the concentration of gas in the vicinity of the well bore has decreased to a level below about 5%. Computer simulations for a medium porosity reservoir having a permeability of greater than about 500 milidarcies and containing relatively light oil of a viscosity of about 5 centipoise or less show that waiting times can be expected to be relatively short, a period of ten days or less.

The method of this invention is practiced by injecting a volume of gas into the uppermost well of the attic oil reservoir, waiting until the gas concentration at the well bore is less than about 10%, adding a water excluding agent to the well bore, waiting the remainder of the time period necessary for the injected gas volume to migrate updip, and then placing the well back on oil production. My invention comprises the novel step of adding a water excluding agent to the well bore during the waiting period. As the injected gas bubble moves towards the top of the reservoir, formation liquids are displaced downwards along with the injected water excluding agent. By the time the well is put back on production, the water excluding agent was moved to a position around and beneath the producing well. In this manner a selective permeability barrier to the flow of water is created in precisely the position necessary to inhibit the formation of a water cone.

Several water excluding agents are useful in the practice of this invention. Among them are partially hydrolyzed polyacrylamides and copolymers of acrylic acid and acrylamide such as Dow Zone Control "P" and Calgon WC-500. Their use is well known in the art.

Once the complete sequence of steps in the practice of this invention is completed the well will be put back on oil production. The prudent operator will take care not to produce oil at such a high rate as to cause premature water coning and consequent high water oil ratios in the produced fluids.

The field use of this invention is illustrated in the following example:

EXAMPLE II

The last updip well in a petroleum reservoir has recently watered out indicating that the oil-water contact has risen to a level of the producing interval in that well, and that further production by conventional methods is not justified. The operator has decided to employ a gas injection program to recover the remaining oil from the attic oil reservoir above the producing interval in the well. The reservoir itself consists of a sandstone formation inclined at a dip angle of 30° with a thickness of 45' which is sealed at the updip limit by a fault. The width of the reservoir at the oil-water contact has been determined to be 1500'. The porosity of the formation is 19%, the permeability is 800 millidarcies and the oil contained therein has a viscosity of 4 centipoise. The operator has determined from other geologic information that the oil-water contact should be lowered 15 feet. Utilizing the above parameters for this reservoir in the equation given in Example I, the operator then determines the amount of gas necessary to be injected.

$$\Delta Q_I = \frac{.178 \, \phi \, E_{DOW} hL}{B_g \sin\theta}$$

$$= \frac{.178 \times .19 \times 0.8 \times 45 \times 1500}{0.7 \times 0.5}$$

= 5220 *MSCF* per foot of oil-water contact depression $\Delta Q_I$ total $= 15 \times 5220 = 78,300$ MSCF of gas total This quantity of gas is then injected at a rate of 1 MSCF per day. Upon completion of the gas injection step the well is shut in for 5 days. Other reservoir studies have indicated that this 5 day time period is sufficient to allow the gas concentration in the vicinity of the well bore to decrease to a level of around 10%. At this point the operator then adds 2000 barrels of formation water containing 1000 ppm of a selective water excluding agent as Dow Zone Control "P" or Calgon WC-500 to the well bore which acts to selectively exclude water from the vicinity of the well bore. The operator then waits for the remainder of the time period necessary for the gas bubble to migrate to the top of the attic oil reservoir. At this point the well is once again put back on production and a substantial quantity of additional oil is produced therefrom.

The examples above have been presented for purposes of illustration only and should not be considered as limitative. The spirit and scope of my invention are found in the following claims.

I claim:

1. In a sloping underground petroleum reservoir penetrated by a well at a structural position in the reservoir above which no other wells have been drilled, and above which well there remains a substantial amount of crude oil within the structurally highest portion of the reservoir known as the attic oil reservoir wherein oil is recovered from the attic oil reservoir by sequentially injecting through the well an effective volume of gas, waiting with the well shut in for a period of time sufficient for the injected gas to move toward the top of the attic oil reservoir, and then producing the crude oil displaced by the injected gas from the well, the improvement comprising:

injecting into the well an effective amount of a water excluding agent.

2. The method of claim 1 further comprising injecting the water excluding agent into the well only after the residual gas saturation in the immediate vicinity of the well bore has decreased below a level of about 10%.

3. The method of claim 1 further comprising producing crude oil from the well only after the residual gas saturation in the immediate vicinity of the well bore falls to a level below about 5%.

4. The method of claim 1 wherein the gas injected is natural gas.

5. The method of claim 1 wherein the water excluding agent is selected from the group consisting of partially hydrolyzed polyacrylamides and copolymers of acrylic acid and acrylamide.

* * * * *